United States Patent [19]

Chapman et al.

[11] 4,238,603

[45] Dec. 9, 1980

[54] POLYAMIDES DERIVED FROM HEXAMETHYLENE DIAMINE, TEREPHTHALIC ACID, ISOPHTHALIC ACID AND A $C_5$ TO $C_{10}$ ALIPHATIC DIBASIC ACID

[75] Inventors: Richard D. Chapman; Donald A. Holmer; Oscar A. Pickett, Jr.; James H. Saunders, all of Pensacola, Fla.

[73] Assignee: Monsanto Company, St. Louis, Mo.

[21] Appl. No.: 798,502

[22] Filed: May 19, 1977

Related U.S. Application Data

[63] Continuation-in-part of Ser. No. 749,184, Dec. 9, 1976, abandoned, which is a continuation of Ser. No. 631,244, Nov. 12, 1975, abandoned.

[51] Int. Cl.$^3$ ............................................. C08G 69/26
[52] U.S. Cl. ........................................ 528/339; 264/235; 264/346; 528/347
[58] Field of Search ............ 528/339, 347; 260/78 R

[56] References Cited

U.S. PATENT DOCUMENTS 3,926,924  12/1975  Edgar et al. .................... 260/78 R

OTHER PUBLICATIONS

Oronite Chemical Co.–Oronite Isophthalic, Apr. 1955, Bulletin No. 10.

*Primary Examiner*—Harold D. Anderson
*Attorney, Agent, or Firm*—John W. Whisler

[57] ABSTRACT

Fiber-forming polymers are prepared from a mixture of the hexamethylene diamine salts of terephthalic acid, isophthalic acid, and a small amount of at least one aliphatic dibasic acid (e.g. adipic acid) having from 5 to 12 carbon atoms. The polymers can be prepared in a batch autoclave and extruded therefrom without cleaning the autoclave between successive runs.

4 Claims, No Drawings

POLYAMIDES DERIVED FROM HEXAMETHYLENE DIAMINE, TEREPHTHALIC ACID, ISOPHTHALIC ACID AND A $C_5$ TO $C_{10}$ ALIPHATIC DIBASIC ACID

CROSS REFERENCE TO RELATED APPLICATIONS

This application is a continuation-in-part of copending application Ser. No. 749,184, filed Dec. 9, 1976, now abandoned, which in turn is a continuation of application Ser. No. 631,244, filed Nov. 12, 1975, now abandoned.

BACKGROUND OF THE INVENTION

1. Field of the Invention

This invention relates to a fiber-forming random polyamide consisting of recurring units of the formulas:

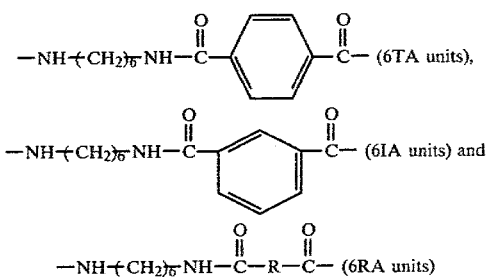

wherein R is a $C_3$ to $C_{10}$ alkylene and wherein from 30 to 40% of the units are 6IA units and from 2–15% of the units are 6RA units. These polyamides can be prepared and shaped into fibers by conventional melt polymerization and melt extrusion techniques.

2. Description of the Prior Art

U.S. Pat. No. 4,022,756 describes a batch process for preparing fibers of a polyamide consisting essentially of recurring 6TA and 6IA units in a mole ratio of between 50:50 and 80:20, respectively. In carrying out the process, an aqueous solution of an appropriate mixture of hexamethylene diammonium terephthalate (6TA salt) and hexamethylene diammonium isophthalate (6IA salt) is heated in a suitable vessel (e.g. autoclave) under conditions of controlled time, temperature and pressure to provide molten polymer (referred to herein as 6TA/6IA). Then, the molten 6TA/6IA is extruded directly from the base of the autoclave into fibers which are heat treated in the manner described in U.S. Pat. No. 4,022,756. The heat treated 6TA/6IA fibers are dimensionally stable and are characterized in having a relatively high moduli (e.g. 80–110 gpd) and the dye performance and adhesion-to-rubber characteristics of nylon 66. The 6TA/6IA fibers are particularly useful in carpet, wrinkle-resistant apparel fabrics and reinforcing structures such as tire cord.

One difficulty encountered in extruding 6TA/6IA (particularly 6TA/6IA consisting of 60 mole % or more 6TA) into fiber by the batch process described in U.S. Pat. No. 4,022,756 is that a small amount of 6TA/6IA remains as a shell on the inner wall and agitator of the autoclave after extrusion. Unfortunately, the 6TA/6IA shell, unlike a nylon 66 shell, does not entirely melt during the next polymerization. Particles of the 6TA/6IA shell disperse in the molten 6TA/6IA formed in the next polymerization to yield heterogeneous 6TA/6IA, a condition referred to herein as "polymer heterogeneity". Attempts to provide useful fibers by melt extrusion (melt spinning) of heterogeneous 6TA/6IA has not been entirely successful. In those instances where fibers are obtained, the fibers contain opaque particles of noticeable size, and generally have unacceptable properties. Therefore, high quality fibers can be obtained only by cleaning the autoclave between each run (i.e. polymerization and extrusion) to remove the 6TA/6IA shell that remains therein after extrusion. Cleaning of the autoclave is time consuming and costly and, therefore, is not feasible for commercial operations.

Accordingly, it is an object of the present invention to provide a modified fiber-forming 6TA/6IA which can be extruded into fibers by a batch process without encountering polymer heterogeneity and without cleaning the extrusion vessel between successive runs to remove the polymer shell therefrom.

Another object of the invention is to provide a modified 6TA/6IA fiber which has properties, such as modulus and boiling water shrinkage, comparable to the 6TA/6IA fiber described in U.S. Pat. No. 4,022,756.

SUMMARY OF THE INVENTION

In accordance with the present invention the foregoing objects are accomplished by modifying 6TA/6IA to provide a polyamide consisting essentially of recurring units of the formulas:

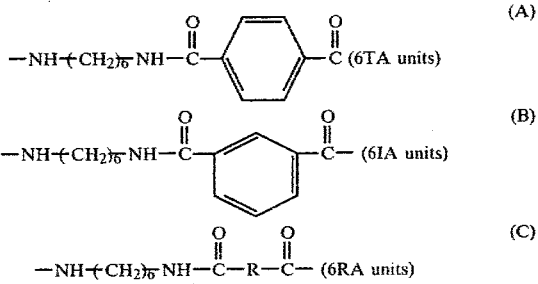

wherein R is a $C_3$ to $C_{10}$ alkylene and wherein from 30 to 40% of the units are 6IA units and from 2–15% of the units are 6RA units; the remaining units of the polymer (45 to 68 percent) are 6TA units. Polymers of this description are referred to herein as "6TA/6IA/6RA".

Fibers prepared from the 6TA/6IA/6RA of the present invention have properties substantially the same as the 6TA/6IA fibers described in U.S. Pat. No. 4,022,756, for example, 6TA/6IA/6RA fibers have dimensional stability as evidenced by boiling water shrinkage values (BWS) of less than about 10% (e.g. 1 to 10%), adhesion and dye performance comparable to nylon 66 fibers, and moduli ranging from about 80–110 gpd.

Terpolyamides composed of 66 units

6TA units and 6IA units, wherein at least 50% by weight of the terpolyamide is 66 units and from 20–40% by weight is 6TA units, are described in U.S. Pat. Nos. 3,621,089 and 3,926,924. Fibers of these terpolymers, however, have low moduli (22–43 gpd) in comparison to the fibers of the present invention and, therefore, lack wrinkle-resistant properties.

DETAILED DESCRIPTION OF THE PREFERRED EMBODIMENTS

6TA/6IA/6RA may be prepared by melt polymerization of a salt mixture consisting of hexamethylenediammonium terephthalate (6TA salt), hexamethylenediammonium isophthalate (6IA salt) and 6RA salt, for example hexamethylenediammonium adipate (66 salt). The salts may be used in proportions ranging from 30 to 40 mole % 6IA salt, 2 to 15 mole % 6RA salt, 45 to 68 mole % 6TA salt. Instead of 66 salt, another salt or salts of hexamethylenediamine and a dicarboxylic acid of the formula HOOC—R—COOH may be used where R is a $C_3$ to $C_{10}$ alkylene. The conversion of each salt of the mixture to its corresponding polymer unit is substantially 100%.

In order to effectively eliminate polymer heterogeneity, at least about 2 mole % of the salt mixture must consist of 6RA salt. On the other hand, if more than about 15 mole % of the salt mixture consists of 6RA salt, the boiling water shrinkage values, tensile properties and moduli of fibers prepared from the resulting polymers are adversely affected. Satisfactory results are generally obtained when from 7 to 12 mole % of the salt mixture used in preparing polymers of the invention consists of 6RA salt. In general, if more than about 40 mole % of the salt mixture consists of 6IA salt, fibers prepared from the resulting polymers are difficult to crystallize, whereas if less than about 30 mole % of the salt mixture consists of 6IA salt, it is difficult to shape fibers from the resulting polymer due to the high melting point of the resulting polymer.

6RA salts useful in preparing copolyamides of the invention include the hexamethylene diamine salts of glutaric, adipic, azelaic, suberic, sebacic or dodecanedioic acids. If desired, a mixture of two or more 6RA salts may be used. Hexamethylenediammonium adipate (66 salt) is a preferred 6RA salt for use in preparing polymers of the invention.

The salts used in preparing polymers of the invention should be of the highest possible purity and may be made by conventional techniques commonly employed in making simple polyamide salts, for example, hexamethylene diammonium adipate (66 salt).

Fibers may be shaped from 6TA/6IA/6RA by melt spinning techniques utilizing the batch process described in U.S. Pat. No. 4,022,756, wherein an aqueous solution of the 6TA, 6IA, 6RA salts are polymerized in a batch autoclave to provide molten 6TA/6IA/6RA which is extruded through a spinneret attached to the base of the autoclave to provide fiber. Successive runs (i.e. batches) can be made with the copolymers of this invention in a autoclave without removing the polymer shell from the autoclave between runs and without encountering polymer heterogeneity.

The resulting essentially amorphous fibers are drawn and heat treated in the manner described in U.S. Pat. No. 4,022,756 to increase their crystallinity and to otherwise enhance their physical properties. The heat treatment of the essentially amorphous fiber may be accomplished during or after the fiber is drawn to a desired denier. Generally, the fiber is drawn a total of 3.0 to 5.0 times its original length. When the fiber is drawn prior to heat treatment, it may be drawn in a single stage over a heated pin (85°–115° C.). Drawing of the essentially amorphous fiber without heat treatment results in orientation of the polymer molecules in the direction of the fiber axis but does not significantly increase the crystallinity of the fibers. However, after the drawn, essentially amorphous fiber is heat treated, the fiber has a relatively high degree of crystallinity. Heat treatment of the fiber is conveniently accomplished by heating the fiber to a temperature which is above the glass transition temperature (Tg) of the polymer and below the temperature at which the fiber becomes molten and, preferably, at a temperature above about 160° C. Annealing of the fiber may be accomplished by subjecting the fiber to a heated environment, such as heated inert fluid (e.g. steam, air or nitrogen) or a heated surface such as a hot shoe. A preferred means for heating the fiber is accomplished by continuously advancing the fiber through an electrically heated tube blanketed with steam or heated nitrogen. Other means include continuously advancing the fiber through a chamber equipped with an infrared heater or over a heated curved surface. If desired, the fiber may be merely placed in an oven and heated. The length of time that the fiber is in contact with the heated environment will depend on factors such as the temperature of the heated environment and denier of the fiber. Various means and conditions that may be used in heat treatment of the fibers will be apparent to those skilled in the art.

It has been found that the physical properties of the fibers are influenced by the amount of tension the fibers are under during heat treatment. For example, drawn fibers which are slack when heat treated will have minimum boiling water shrinkage (BWS) values, for example lower than 2%, while drawn fibers which are under considerable tension when heat treated (e.g., when further drawn at a draw ratio of 1.12 to 1.2 during heat treatment) generally will have BWS values between 8% and 10%. Accordingly, drawn fibers which are under intermediate tensions when heat treated will have BWS values ranging from 2% to 8%. The strength of the fibers on the other hand is directly proportional to the amount of tension the fibers are under during heat treatment. Fibers which are under tension when heat treated will have greater strength than fibers which are slack when heat treated.

The following examples are given for purposes of further illustrating the invention but are not intended to in any way limit the scope of the invention.

Tensile properties of fibers given in the examples were measured on an Instron Tester (Instron Engineering Corporation, Canton, Mass.) providing a constant extension rate of 120% per minute with a gauge length of 25 cm. being used. Intrinsic viscosities [η] given in the examples are defined by the following equation:

$$[\eta] = \frac{\sqrt{2(RV - 1 - \ln RV)}}{C},$$

where RV represents the relative viscosity and C represents a concentration of 0.4 gram of the polymer in 100 ml. of solvent. The relative viscosity is determined by dividing the flow time in a capillary viscometer of a dilute solution of the polymer by the flow time for pure solvent. The dilute solutions used herein for determining RV are of the concentration expressed by (C) above; flow times are determined at 25° C. using 95%–98% concentrated sulfuric acid as the solvent.

Percent boiling water shrinkage (% BWS) values given in the examples were determined by the following procedure. Two clamps are secured along a length ($L_1$) of fiber so that the distance between the clamps when the fiber is extended is between 15 and 50 cm. The fiber with the clamps secured thereto is then immersed in boiling water for 10 minutes. The fiber is then removed and dried under ambient conditions. The distance between the clamps when the fiber is extended is again measured ($L_2$). The % boiling water shrinkage (BWS) is determined by the following equation:

$$\% \, BWS = \left(\frac{L_1 - L_2}{L_1}\right) \times 100$$

EXAMPLE 1

This example illustrates the preparation of 6TA/6IA/66(60/35/5) polymer, i.e. 6TA/6IA/6RA polymer consisting of 60 mole % of 6TA units, 35 mole % of 6IA units and 5 mole % of 66 units, and the melt spinning thereof into yarn. 90.0 g. (0.3188 mole) of 6TA salt, 52.5 g. (0.1859 mole) of 6IA salt, 7.0 g. (0.0267 mole) 66 salt, and 100 g. of deionized water were charged to a stainless steel autoclave. After thoroughly purging the autoclave and its contents with nitrogen, the autoclave was pressurized to 250 psig (18 atm) with nitrogen. The autoclave was then heated to 220° C. over a period of 25 minutes while stirring and maintaining the pressure constant at 250 psig. The temperature was then increased to 300° C. over a period of 27 minutes while maintaining the pressure at 250 psig. The pressure was then reduced to atmospheric over a period of 25 minutes while increasing the temperature to 316° C. A 14-hole spinneret was then attached to the base of the autoclave and the polymer ($[\eta]=0.824$) was extruded through the spinneret by the application of 250 psig (18 atm) nitrogen. The resulting yarn was collected on a bobbin using a conventional winder. The yarn was then drawn 3.60X over a 2" pin at 100° C. to provide an 80 denier yarn having an elongation of 18% and a tenacity of 3.8 gpd.

EXAMPLE 2

This example illustrates the preparation of 6TA/6IA/66(60/30/10) polymer ($[\eta]=0.81$) and the melt spinning thereof into yarn. The polymer and yarn were prepared according to the procedure of Example 1. In this instance the polymer was prepared from a mixture of 6TA, 6IA and 66 salts in which the salts were present in a molar ratio of 60:30:10, respectively. The yarn was collected and then drawn 3.70 times to a denier of 80. The drawn yarn had an elongation of 18% and a tenacity of 3.7 gpd.

EXAMPLE 3

This example illustrates the preparation of 6TA/6IA/66(55/35/10) polymer ($[\eta]=0.80$) and the melt spinning thereof into yarn. The polymer and yarn were prepared according to the procedure of Example 1. In this instance the polymer was prepared from a mixture of 6TA, 6IA and 66 salts in which the salts were present in a molar ratio of 55:35:10, respectively. The yarn was collected and then drawn 3.95 times to a denier of 71. The drawn yarn had an elongation of 16% and a tenacity of 3.7 gpd.

EXAMPLE 4

This example illustrates the preparation of 6TA/6IA/66(50/35/15) polymer and the melt spinning thereof into yarn. The polymer and yarn were prepared according to the procedure of Example 1. In this instance the polymer was prepared from a mixture of 6TA, 6IA and 66 salts in which the salts were present in mole ratio of 50:35:15, respectively. The yarn was collected and then drawn 3.80 times to a denier of 74. The drawn yarn had an elongation of 20% and a tenacity of 2.8 gpd.

EXAMPLE 5

A sample of each of the yarns of Examples 2–4 was annealed by continuously advancing the yarn at constant length (draw ratio of 1.0) and at a speed of 125 feet (38.1 meters) per minute through a chamber having a length of 30.5 cm and containing infra-red heaters. The chamber was maintained at a temperature of about 300° C. For purposes of comparison a 70 denier, 14 filament yarn prepared from 6TA/6IA(65/35) was also annealed under the same conditions. The % BWS of each of the yarns was determined before and after annealing and is given in Table I.

TABLE I

| Molar Composition 6TA/6IA/66 | % BWS Before Annealing | After Annealing |
|---|---|---|
| 65/35/0 | 22.0 | 6.6 |
| 60/30/10 | 22.2 | 5.6 |
| 55/35/10 | 21.9 | 8.7 |
| 50/35/15 | 38.7 | 9.5 |

The results in Table I show that yarns made from polymers of the present invention may be annealed to provide dimensionally stable yarns which are comparable to annealed yarns of 6TA/6IA polymer.

EXAMPLE 6

This example illustrates that fibers of polymers of the present invention can be made by a batch process in an autoclave without cleaning the autoclave between successive runs to remove the polymer shell from the autoclave and without encountering polymer heterogeneity. In the batch process two successive runs were made without cleaning the autoclave after the first run. In each run a mixture of 6TA, 6IA and 66 salts were polymerized in the autoclave to form molten polymer. The molten polymer was then extruded from the base of the autoclave into water, recovered and, where possible, melt spun into yarn.

6TA/6IA/66(55/35/10) polymer was prepared by charging 825 g. (2.922 mole) of 6TA salt, 525 g. (1.859 mole) of 6IA salt, 140 g. (0.534 mole) of 66 salt, and 1000 g. $H_2O$ to a clean autoclave. After purging thoroughly with purified nitrogen, the autoclave was sealed and heated to 200° C. while stirring and allowing the pressure to increase to 200 psig (14.6 atm). The temperature and pressure were then held constant for 15 minutes. The temperature was then increased to 218° C. over a period of 3 minutes while allowing the pressure to increase to 250 psig (18 atm) and remain constant. The temperature was then raised to 300° C. (250 psig or 18 atm) over a period of 30 minutes. The pressure was then reduced to atmospheric pressure over a period of 65 minutes while increasing the melt temperature to 320° C. The polymer was then extruded from the autoclave and quenched in water. The extruded polymeric mass was clean and homogeneous. Following extrusion about 150 g. of polymer were left in the autoclave as a shell on the walls and agitator. A second polymerization was then carried out in the autoclave in the presence of the polymer shell using substantially the same procedure and conditions that were used in the first polymerization. The extruded polymeric mass was clear, homogeneous and easily melt spun into yarn. After the second polymerization about 145 g. of polymer remained in the autoclave after extrusion.

For purposes of comparison 6TA/6IA(65/35) polymer was prepared by charging 975 g. (3.453 mole) of 6TA salt, 525 g. (1.859 mole) of 6IA salt, and 1000 g. H₂O to a clean autoclave. Polymerization was accomplished using substantially the same procedure and conditions that were used above. About 145 g. of polymer remained in the autoclave after extrusion. A second polymerization was then carried out in the autoclave in the presence of the polymer shell using substantially the same procedure and conditions that were used in the first polymerization. The resulting extruded polymeric mass contained lumps of white, opaque material dispersed in a clear polymer matrix, i.e. the polymeric mass was heterogeneous. The heterogeneities prevented melt spinning of the polymer into the yarn.

EXAMPLE 7

In this example fibers of the present invention were prepared and the tensile properties thereof were determined.

In this example, four fibers were prepared from polymers of the present invention using the same monomers and general procedure described in Example 1. The tensile properties of each of these fibers as well as the composition of the fiber are given in Table II. For purposes of comparison a 6TA/6IA(65/35) fiber was also prepared and tested.

TABLE II

| Yarn No. | Polymer Composition Mole % 6TA/6IA/66 | Tenacity gpd | Elongation % | Modulus gpd |
|---|---|---|---|---|
| 1 | 56/33/11 | 3.7 | 7 | 93 |
| 2 | 56/33/11 | 3.5 | 9 | 86 |
| 3 | 58/32/10 | 4.6 | 7 | 99 |
| 4 | 58/32/10 | 4.5 | 9 | 92 |
| 5 | 65/35 | 2.5 | 5 | 90 |

The foregoing examples illustrate that fibers comparable to 6TA/6IA fibers can be prepared in a batch autoclave from polymers of the present invention without encountering polymer heterogeneity.

We claim:

1. A fiber-forming random copolyamide consisting essentially of the following recurring units

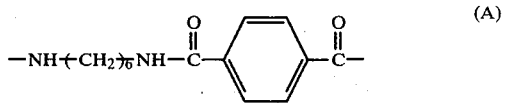

(A)

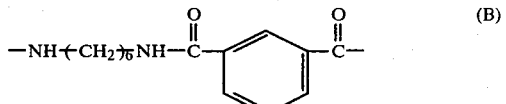

(B)

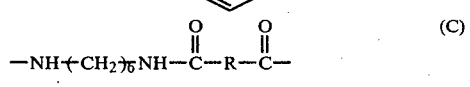

(C)

wherein R is a $C_3$ to $C_{10}$ alkylene and is the same or different in successive (C) units and wherein from 30 to 40 percent of the recurring units are (B) units, from 2–15 percent of the recurring units are (C) units, and the remainder of the recurring units are (A) units, said copolyamide in fiber form being characterized in having a modulus ranging from about 80 to 110 grams per denier measured using a constant extension rate of 120% per minute with a gauge length of 25 centimeters.

2. The copolyamide of claim 1 wherein from 7 to 12 percent of the recurring units are (C) units.

3. The copolyamide of claim 1 wherein R is $+CH_2)_4$.

4. The copolyamide of claim 1 in the form of a fiber.

* * * * *